(12) United States Patent
Haselwanter et al.

(10) Patent No.: US 10,618,384 B2
(45) Date of Patent: Apr. 14, 2020

(54) TWO-PART COMPONENT

(71) Applicant: MAGNA STEYR ENGINEERING AG & CO KG, Graz (AT)

(72) Inventors: Alexander Haselwanter, Graz (AT); Aytac Temur, Kirchheim (DE); Juergen Wening, Nuremberg (DE)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 15/031,960

(22) PCT Filed: Oct. 24, 2014

(86) PCT No.: PCT/EP2014/072858
§ 371 (c)(1),
(2) Date: Apr. 25, 2016

(87) PCT Pub. No.: WO2015/059279
PCT Pub. Date: Apr. 30, 2015

(65) Prior Publication Data
US 2016/0263971 A1    Sep. 15, 2016

(30) Foreign Application Priority Data
Oct. 25, 2013   (DE) .................. 10 2013 221 739

(51) Int. Cl.
*B32B 7/12* (2006.01)
*B60J 5/00* (2006.01)
(Continued)

(52) U.S. Cl.
CPC .................. *B60J 5/00* (2013.01); *B32B 3/04* (2013.01); *B32B 7/08* (2013.01); *B32B 7/12* (2013.01);
(Continued)

(58) Field of Classification Search
CPC .... Y10T 428/24215; Y10T 428/24264; B23K 33/008
See application file for complete search history.

(56) References Cited

U.S. PATENT DOCUMENTS

| 5,451,742 A * | 9/1995 | Nishio ................. B23K 26/22 219/121.64 |
| 2006/0006697 A1 | 1/2006 | Debuan et al. |

(Continued)

FOREIGN PATENT DOCUMENTS

| CN | 102963430 A | 3/2013 |
| DE | 102004033184 A1 | 1/2006 |

(Continued)

*Primary Examiner* — Alexander Thomas
(74) *Attorney, Agent, or Firm* — Dickinson Wright PLLC

(57) ABSTRACT

The invention relates to a two-part component for a vehicle body comprising an outer sheet (1) and an inner sheet (2), wherein the outer sheet (1) is connected to the inner sheet (2) along their rims at least in one connection section (3) in such a manner that the outer sheet (1) and the inner sheet (2) run parallel to one another in a first region (4) of the outer sheet (1), wherein an adhesive material (5) is introduced in the first region (4) between the outer sheet (1) and the inner sheet (2), and wherein in a second region (6) of the outer sheet (1), the outer sheet (1) is bent against the inner side of the inner sheet (2), wherein in the second region (6) of the outer sheet (1), the outermost rim of the outer sheet (1) is welded to the inner side of the inner sheet along the connection section (3), and to a production method for same.

10 Claims, 6 Drawing Sheets

(51) Int. Cl.
  B60J 5/04 (2006.01)
  B32B 3/04 (2006.01)
  B32B 7/08 (2019.01)
(52) U.S. Cl.
  CPC ....... B60J 5/0469 (2013.01); B32B 2260/046 (2013.01); B32B 2605/00 (2013.01)

(56) References Cited

U.S. PATENT DOCUMENTS

| | | |
|---|---|---|
| 2009/0200359 A1 | 8/2009 | Chen et al. |
| 2010/0072785 A1 | 3/2010 | Wang |
| 2011/0156444 A1* | 6/2011 | Tao ........................ B21D 19/12 296/191 |

FOREIGN PATENT DOCUMENTS

| | | |
|---|---|---|
| DE | 102005019016 A1 | 10/2006 |
| DE | 102009009808 A1 | 8/2009 |
| DE | 102010064055 A1 | 6/2011 |
| EP | 2141255 A1 | 1/2010 |

* cited by examiner

TWO-PART COMPONENT

CROSS-REFERENCE TO PRIOR APPLICATIONS

This U.S. National Stage Patent Application claims the benefit of PCT International Patent Application Serial No. PCT/EP2014/072858 filed Oct. 24, 2014 entitled "Two-Part Component," which claims the benefit of DE Application Serial No. 10 2013 221 739.0 filed Oct. 25, 2013, the entire disclosures of the applications being considered part of the disclosure of this application and hereby incorporated by reference.

FIELD OF THE INVENTION

The present invention relates to a two-part component for a vehicle body comprising an outer sheet and an inner sheet, and to a method for producing such a two-part component.

PRIOR ART

Two-part components of this kind are used in particular for doors, hatches and covers of vehicles, for example for sliding doors or conventional car doors. In most cases, a thicker inner sheet is used which ensures the structural rigidity of the component and serves as support for attachments such as hinges. A thinner outer sheet is usually connected, in particular welded, to the inner sheet in the region of the rims of the outer and inner sheets.

A typical connection of this kind of an outer sheet to an inner sheet can be formed in such a manner that the outer sheet is bent at the rim towards its inner side, this means, always towards the side of the inner sheet or towards the interior of the vehicle. The edge of the inner sheet abuts against this bent rim, which rim is now the inner side of the bent outer sheet. The two sheets are welded together in the contact region of this edge. In this usual constellation, a gap occurs between the inner side of the bent outer sheet and the outer side of the inner sheet, which gap has to be sprayed with wax in order to prevent corrosion.

SUMMARY OF THE INVENTION

It is an object of the invention to provide a two-part component for a vehicle body comprising an outer sheet and an inner sheet, which can be produced in a simple manner and ensures a secure connection of the components. It is also an object of the invention to provide such a two-part component which requires no corrosion-resistant layer. It is a further object of the invention to provide a method for producing such a two-part component.

The object is achieved by a two-part component for a vehicle body comprising an outer sheet and an inner sheet, wherein the outer sheet is connected to the inner sheet along their rims at least in one connection section in such a manner that the outer sheet and the inner sheet run parallel to one another in a first region of the outer sheet, wherein an adhesive material is introduced in the first region between the outer sheet and the inner sheet, and wherein in a second region of the outer sheet, the outer sheet is bent against the inner side of the inner sheet, wherein in the second region of the outer sheet, the outermost rim of the outer sheet is welded to the inner side of the inner sheet along the connection section.

The second region therefore is a region of the outer sheet that is located closer to the rim than the first region of the outer sheet and extends up to the end of the outer sheet, thus including the edge at the front side of the outer sheet.

The outer sheet and the inner side of the inner sheet are connected to one another by a weld at the outermost rim of the outer sheet, thus in particular at the edge of the outer sheet.

In the outer sheet's first region, which is farther away from the rim, the outer sheet is adhesively bonded to the inner sheet.

A "connection section" extends in sections along the rims of the outer and inner sheets and is therefore normal to the sequence of first and second regions. For example, it is also possible that a corner section is not configured as a connection section according to the invention and therefore has no bend of the outer sheet.

According to one aspect of the invention, this results not only in a particularly stable connection by means of an easily accessible weld, but, moreover, the use of wax or other anticorrosive agents at the contact lines of the two sheets is no longer required.

A method according to another aspect of the invention for producing a two-part component comprises the steps that an adhesive material is applied in the first region onto the outer sheet, an inner sheet is placed in the first region onto the outer sheet, the outer sheet is bent in the second region against the inner side of the inner sheet, and the outermost rim of the outer sheet is welded to the inner side of the inner sheet along the first connection section.

Refinements of these aspects of the invention are specified in the dependent claims, the description and the accompanying drawings.

The outer sheet is preferably connected to the inner sheet along their rims over the entire periphery of the component in such a manner that the outer sheet and the inner sheet run parallel to one another in some regions, and an adhesive material is introduced there between the outer and inner sheets, thus in the region of the sheets which runs parallel along the entire periphery. The parallel course of the sheets lies in the connection sections in the "first region", but extends preferably also over those sections along the periphery of the component that do not constitute a "connection section", in particular over corner sections, so that adhesion and sealing by means of the introduced adhesive material is also ensured in corner sections. As a result, a dry space is created between the outer and inner sheets within the two-part component's periphery provided with adhesive material.

Particularly preferably, the outermost rim of the outer sheet rests at an acute angle against the inner side of the inner sheet. This acute angle between the rim of the outer sheet and the inside rim of the inner sheet is preferably 8-89 degrees, particularly preferably 12-27 degrees, in particular approximately 25 degrees or approximately 15 degrees. In this manner, good accessibility for welding the sheets can be achieved. Furthermore, sufficient outgassing or evaporation of the zinc layer usually applied onto the sheets is achieved in this manner. Moreover, a sufficient flow-through in the resulting hollow space between the outer sheet and the inner sheet for a later coating process can thus be achieved.

As is usual in vehicle body construction, the sheet thicknesses of the outer and inner sheets lie mostly in the range of approximately 0.8 mm.

The radius of the bend or flange of the outer sheet against the inner sheet is preferably at least 2.5 mm, preferred 3.8 mm, in the case of a single bend. The bend can also be implemented by a double radius of in each case at least 1 mm, for example approximately 1.1 mm or approximately 1.9 mm with a plane section between the two radii of at least 1 mm, for example approximately 1.1 mm.

According to one embodiment, there is a plane section of the outer sheet between the bend of the outer sheet and the outermost rim of the outer sheet, wherein the plane section particularly preferably runs parallel to the outer sheet and the inner sheet.

The length of the plane section is advantageously approximately 4 to 5 mm.

The length of the sloping section between the end of the bend of the outer sheet to the inner sheet or optionally to the end of the plane section on the one hand, and the welded joint of the outer sheet with the inner sheet on the other hand, is preferably approximately 4 to 6 mm.

The welding between the outer sheet and the inner sheet is best carried out by means of laser welding, in particular by tactile laser welding, thus laser welding using tactile sensors. Other joining methods such as laser soldering, for example, are also possible.

A plastic material, preferably polyvinylchloride (PVC), is used as adhesive material and, at the same time, as sealing material, for example. However, using other adhesive materials commonly used in body construction, such as Terokal, is also possible.

BRIEF DESCRIPTION OF THE DRAWINGS

The aspects of the invention are described below by way of example with reference to the drawings.

DETAILED DESCRIPTION OF THE ENABLING EMBODIMENT

Figure 1:
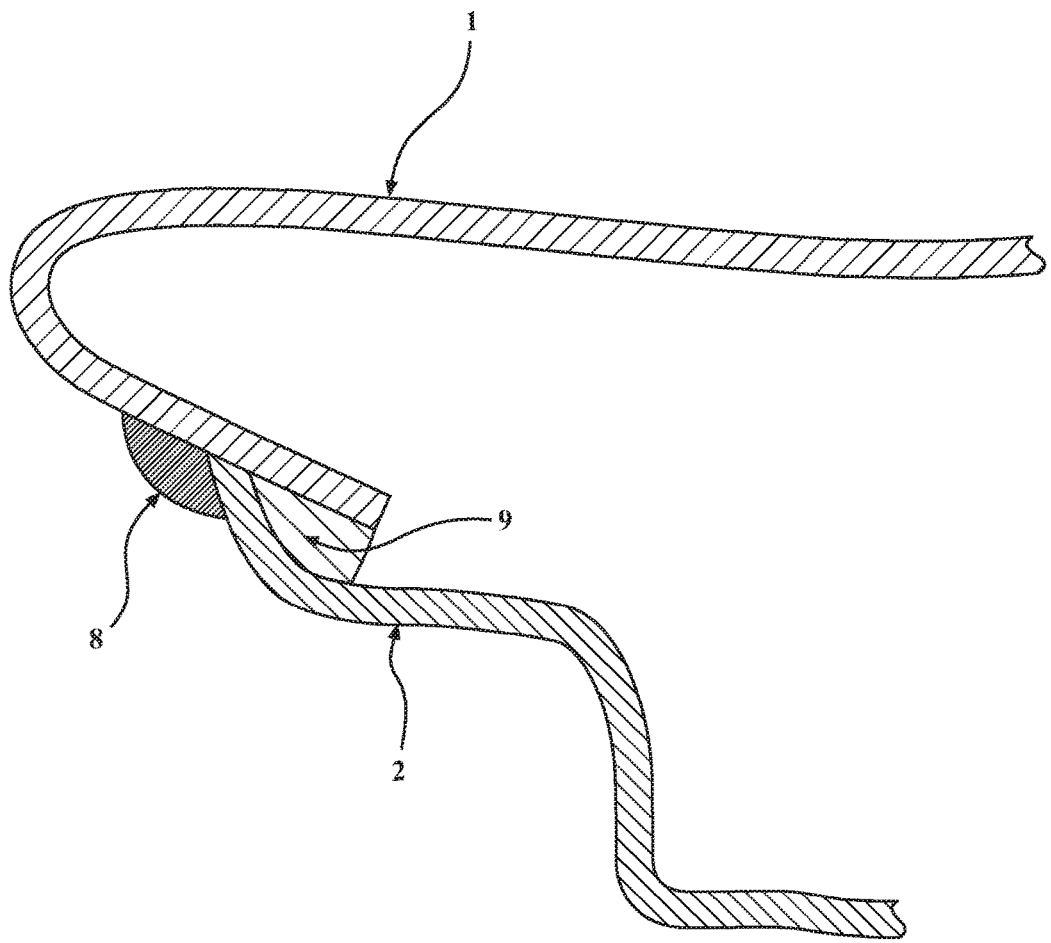
FIG. 1 is a schematic illustration of a two-part component from the prior art, comprising an outer sheet and an inner sheet, viewed from the side.

In FIG. 1, a two-part component known from the prior art comprising an outer sheet 1 and an inner sheet 2 is illustrated. The outer sheet 1 is bent at the rim towards its inner side, thus towards the side of the inner sheet 2. The edge of the inner sheet 2 abuts against this bent rim which rim is now the inner side of the bent outer sheet 1. The two sheets 1, 2 are welded together in the contact region of this edge by means of a weld 8. In order to prevent corrosion, wax as corrosion protection 9 is sprayed into the gap between the inner side of the bent outer sheet 1 and the outer side of the inner sheet 2.

Figure 2:
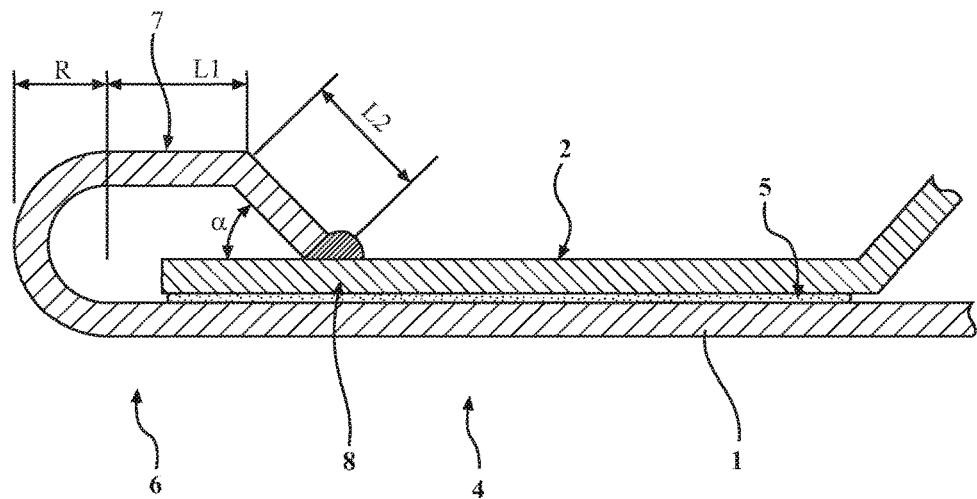
FIG. 2 is a schematic illustration of a two-part component according to one aspect of the invention, comprising an outer sheet and inner sheet, viewed from the side.
Figure 3:
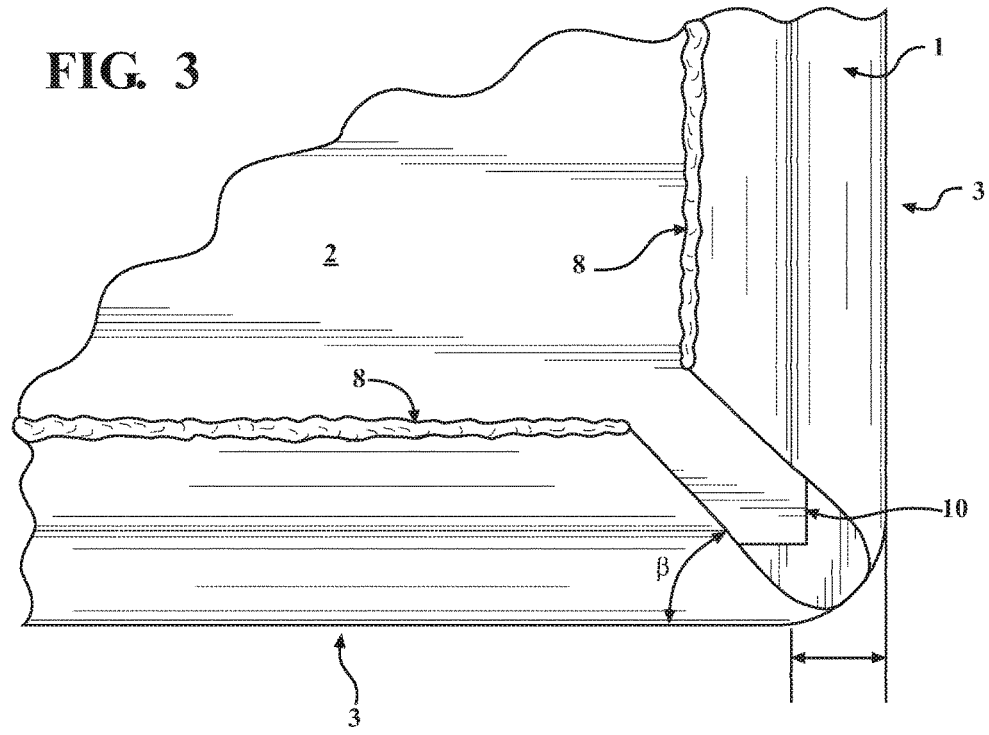
FIG. 3 is a schematic illustration of a two-part component comprising an outer sheet and an inner sheet, viewed from above.

A two-part component according to an aspect of the invention is illustrated in FIG. 2 from the side and in FIG. 3 in a corner region from above. The component comprises an outer sheet 1 and an inner sheet 2, wherein the outer sheet 1 is connected to the inner sheet 2 along their rims in connection sections 3, thus outside of corner section 10. As can be seen in FIG. 3, the corner regions of the sheets 1, 2 require a separate treatment and therefore do not represent connection sections within the meaning of the invention. However, PVC as an adhesive material and sealing material is also introduced between the two sheets 1, 2 in the corner sections 10. The illustrated angle β of the cut of the outer sheet 1 in the corner section is approximately 30 degrees.

As can be clearly seen in FIG. 2, the outer sheet 1 and the inner sheet 2 run parallel to one another in a first region 4 of the outer sheet 1. PVC is introduced as an adhesive material 5 and a sealing material in the first region 4 between the outer sheet and the inner sheet 2. In a second region 6 of the outer sheet 1, the outer sheet 1 is bent against the inner side of the inner sheet 2. The outermost rim of the outer sheet 1 rests against the inner side of the inner sheet 2 and is welded thereto by a weld 8.

At the outermost rim, in particular at the edge thereof, the outer sheet 1 rests at an acute angle α against the inner side of the inner sheet 2. The outer sheet is bent with a radius R of at least 2.5 mm towards the inner sheet 2. Between this bend of the outer sheet 1 and the outermost rim of the outer sheet 1, the outer sheet 1 runs in a plane section 7 which runs parallel to the outer sheet 1 and to the inner sheet 2 in the first region 4. The length L1 of the plane section 7 is approximately 5 to 6 mm. This plane section is followed by a section which has a slope towards the inner sheet 2 and a length L2 of approximately 4-5 mm.

Figure 4A:
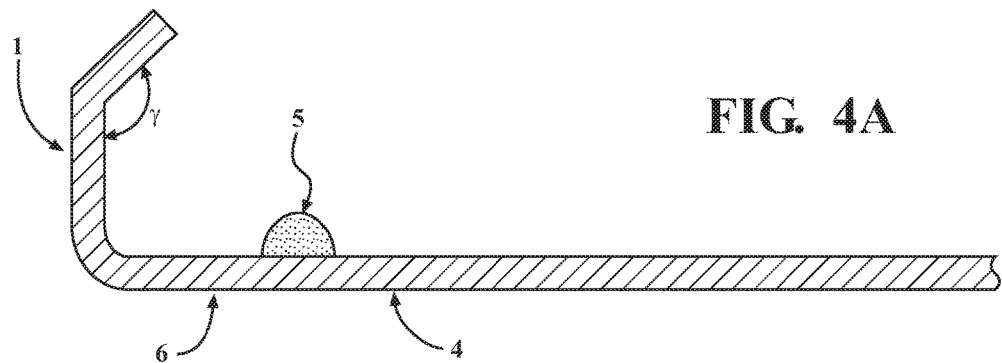
FIGS. 4*a,b,c* are schematic illustrations of method steps for producing a two-part component according to the embodiment of FIG. 2.

Steps for the production according to an aspect of the invention of a two-part component according to FIGS. 2 and 3 are illustrated in FIGS. 4*a, b* and *c*.

Figure 4B:
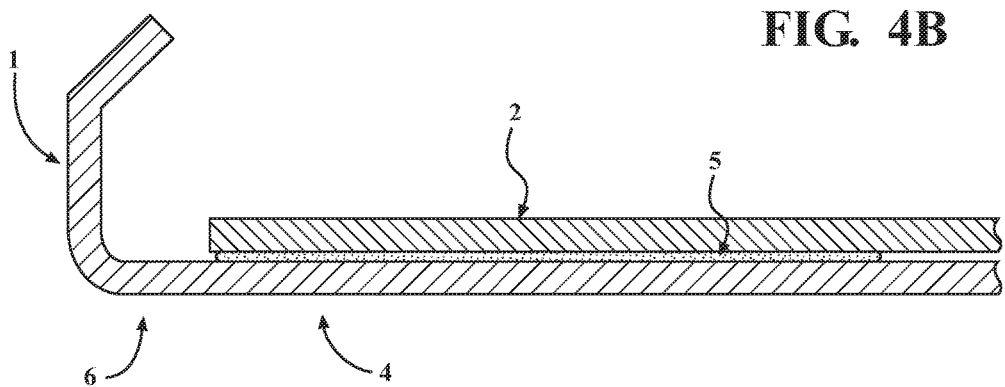
Figure 4C:
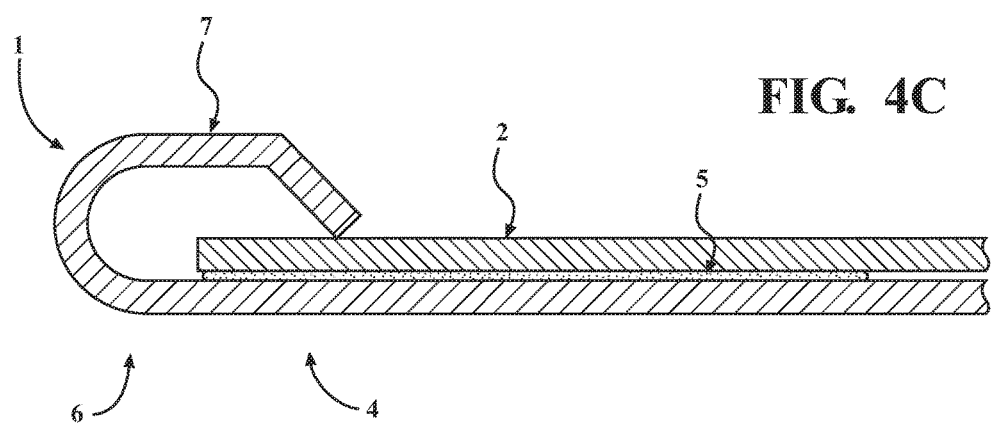

FIG. 4*a* shows in first instance the preparation of the outer sheet 1. The collar of the outer sheet 1 is positioned at a right angle and is bent back at its end at an angle of 165 degrees towards the outer sheet 1. Of course, other solutions are also possible here; thus, the angle γ can be implemented in a range between 91 and 180 degrees, for example, as can also be seen in the FIGS. 5*a-d*. A PVC bead is applied as adhesive material onto the outer sheet 1. As illustrated in FIG. 4*b*, the inner sheet 2 is then placed in the first region 4 onto the outer sheet 1. In doing so, the PVC is compressed to a thickness of approximately 0.2-0.3 mm. Finally, as illustrated in FIG. 4*c*, the outer sheet 1 in the second region 6 is further bent against the inner side of the inner sheet 2 and is preferably kept in place in this position so that the outermost rim of the outer sheet 1 can be welded to the inner side of the inner sheet 2 by means of laser welding.

Figure 5A:
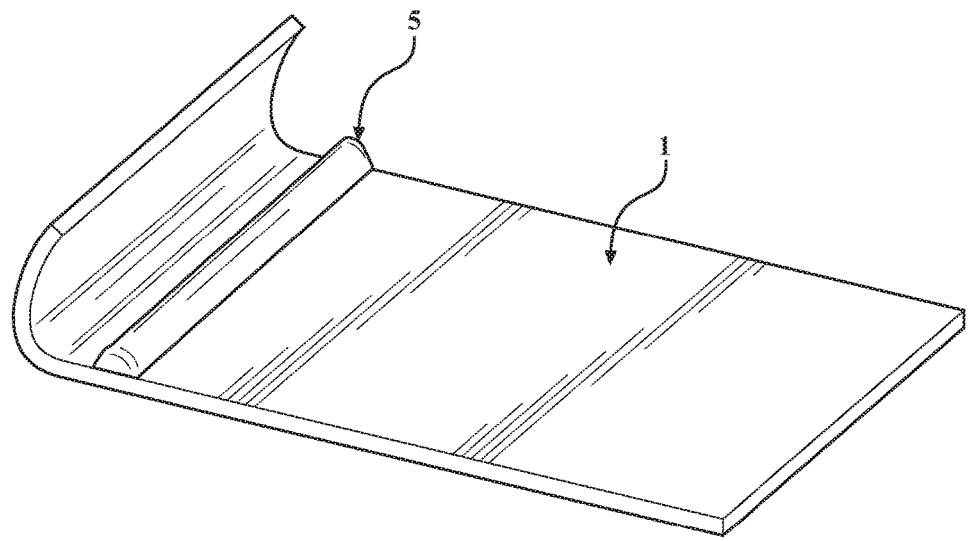
FIGS. 5*a,b,c,d* are schematic illustrations of method steps for producing a further two-part component according to an aspect of the invention.
Figure 5B:
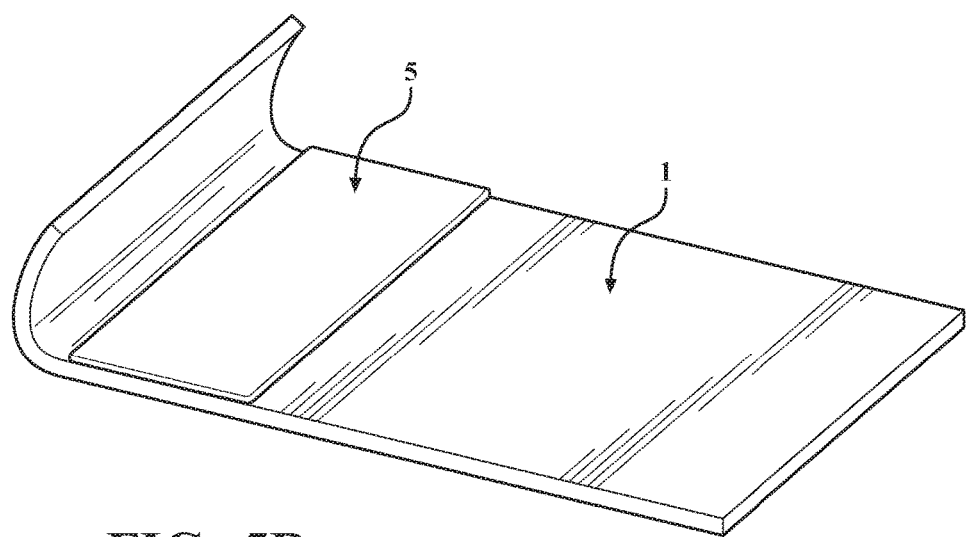
Figure 5C:
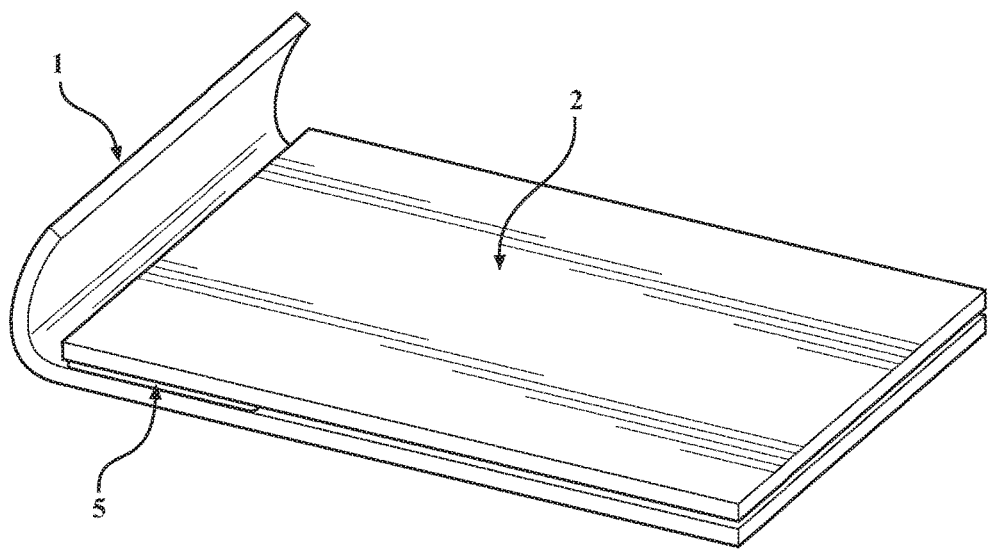
Figure 5D:
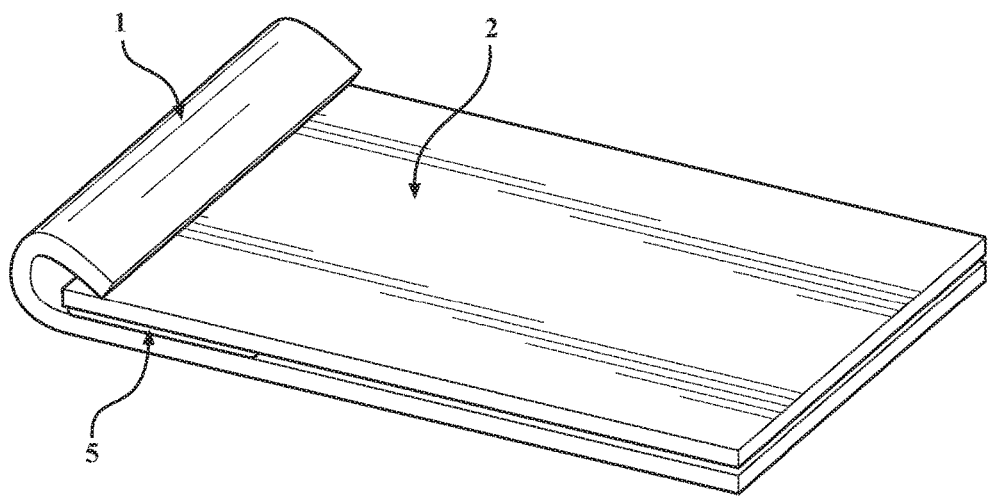

The method for producing a two-part component is also illustrated in FIGS. 5*a, b, c* and *d*, wherein here, the outer sheet 1 has no plane section 7. In FIG. 5*a*, similar to FIG. 4*a*, adhesive material 5 is first applied as adhesive bead onto the outer sheet 1, and in FIG. 5*b*, the adhesive material 5 is compressed into a thin layer. Thereafter, the inner sheet 2 is placed onto the outer sheet 1 having the adhesive material—see FIG. 5*c*—and the outer sheet 1 is further bent so that it can finally be welded to the inner sheet 2—see FIG. 5*d*.

Figure 6:
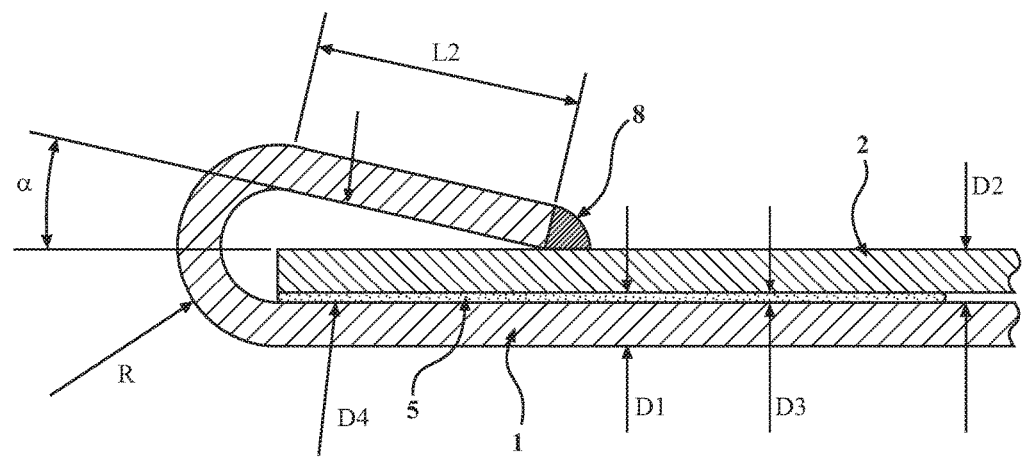
FIG. 6 is a schematic illustration of a further two-part component according to an aspect of the invention, viewed from the side.
Figure 7:
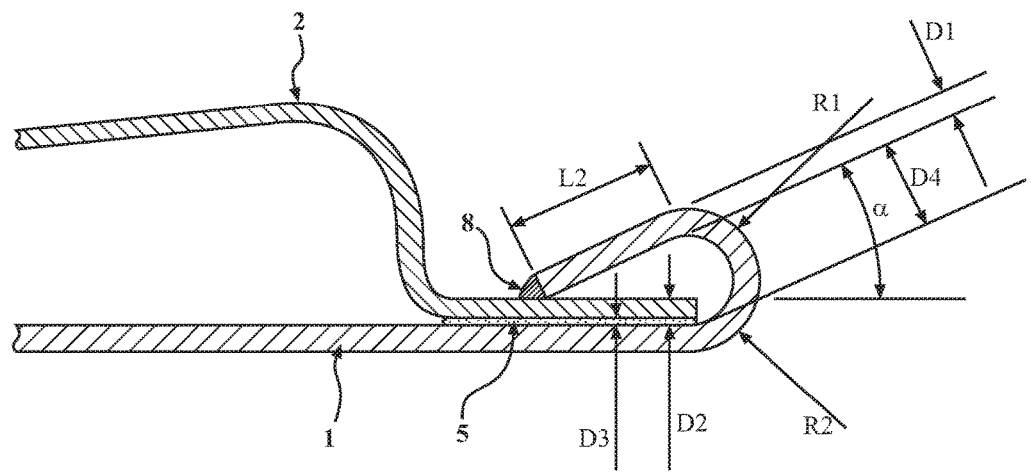
FIG. 7 is a schematic illustration of a further two-part component according to an aspect of the invention, viewed from the side.

Components according to an aspect of the invention without plane section are illustrated in more detail in FIG. 6 and FIG. 7. Bending the outer sheet 1 towards the inner sheet in FIG. 2 is carried out with a single radius R of 3.8 mm which transitions towards the inner sheet into a sloping section L2 of the length 5 mm, the end of which is welded to the inner sheet 2. In this case, the angle α is 15 degrees. The outer sheet 1 and the inner sheet 2 each have a sheet thickness D1 and D2, respectively, of 0.8 mm. The two sheets are separated from one another in the first parallel region by the thickness D3 of the adhesive material of 0.2 mm. The illustrated distance D4 between the inner sides of the outer sheet 1 before and after the bend is 3 mm.

The embodiment of FIG. 7 differs from that of FIG. 6 primarily by the fact that instead of a single bending, bending of the outer sheet is carried out by the two radii R1 and R2 of 1.9 mm each. Between the two radii R1, R2 there is a plane vertical section with a length of approximately 1.1 mm. The sloping section L2 has again a length of 5 mm. In this case, the angle α is approximately 24 degrees. The outer sheet 1 has a sheet thickness D1 of 0.75 mm and the inner sheet 2 has a sheet thickness D2 of 0.8 mm. The thickness of the adhesive material layer D3 is 0.2 mm. The distance D4 between the inner sides of the outer sheet 1 before and after the bend is again 3 mm.

REFERENCE LIST 1 outer sheet
2 inner sheet
3 connection section
4 first region
5 adhesive material
6 second region
7 plane section
8 weld
9 corrosion protection
10 corner section
α angle
β angle
γ angle
R radius of bend
R1 radius of bend
R2 radius of bend
L1 length of the plane section
L2 length of the sloping section
D1 sheet thickness
D2 sheet thickness
D3 thickness of the adhesive material layer
D4 distance

The invention claimed is:

1. A two-part component for a vehicle body comprising:
an outer sheet and an inner sheet, wherein the outer sheet is connected to the inner sheet along their rims at least in one connection section in such a manner that the outer sheet and the inner sheet run parallel to one another in a first region of the outer sheet,
wherein an adhesive material is introduced in the first region between the outer sheet and the inner sheet, and in a second region of the outer sheet, the outer sheet is bent against the inner side of the inner sheet, wherein in the second region of the outer sheet, the outermost rim of the outer sheet is welded to the inner side of the inner sheet along the connection section, and
wherein at the outermost rim, the outer sheet rests at an acute angle (α) against the inner side of the inner sheet and wherein the acute angle (α) is between 12 and 27 degrees.

2. The two-part component according to claim 1, wherein the outer sheet is connected to the inner sheet along their rims over the entire periphery of the component in such a manner that the outer sheet and the inner sheet run parallel to one another in some regions, and an adhesive material is introduced there between the outer sheet and the inner sheet.

3. The two-part component according to claim 1, wherein the radius (R) of the bend of the outer sheet against the inner sheet is at least 2.5 mm, or is implemented as a double radius (R1, R2) of in each case at least 1 mm with a plane section of at least 1 mm between the two radii.

4. The two-part component according to claim 1, wherein welding is carried out by tactile laser welding or laser soldering.

5. The two-part component according to claim 1, wherein the adhesive material is polyvinylchloride.

6. A method for producing a two-part component according to claim 1, wherein an adhesive material is applied in the first region onto the outer sheet, the inner sheet is placed in the first region onto the outer sheet, the outer sheet is bent in the second region against the inner side of the inner sheet, and the outermost rim of the outer sheet is welded to the inner side of the inner sheet along the connection section.

7. A two-part component for a vehicle body comprising:
an outer sheet and an inner sheet, wherein the outer sheet is connected to the inner sheet along their rims at least in one connection section in such a manner that the outer sheet and the inner sheet run parallel to one another in a first region of the outer sheet,
wherein an adhesive material is introduced in the first region between the outer sheet and the inner sheet, and in a second region of the outer sheet, the outer sheet is bent against the inner side of the inner sheet, wherein in the second region of the outer sheet, the outermost rim of the outer sheet is welded to the inner side of the inner sheet along the connection section,
wherein at the outermost rim, the outer sheet rests at an acute angle (α) against the inner side of the inner sheet, and
wherein a plane section is located between the bend of the outer sheet and the outermost rim of the outer sheet, wherein the plane section runs parallel to the outer sheet and the inner sheet in the first region.

8. A two-part component according to claim 7, wherein the length (L1) of the plane section is in the range of 5 to 6 mm.

9. The two-part component according to claim 7, wherein the length (L2) of a sloping section between the end of the bend of the outer sheet to the inner sheet or to the end of the plane section on the one hand, and to the welded joint of the outer sheet with the inner sheet on the other hand, is in the range of 4 to 6 mm.

10. A two-part component for a vehicle body comprising:
an outer sheet and an inner sheet, wherein the outer sheet is connected to the inner sheet along their rims at least in one connection section in such a manner that the outer sheet and the inner sheet run parallel to one another in a first region of the outer sheet,
wherein an adhesive material is introduced in the first region between the outer sheet and the inner sheet, and in a second region of the outer sheet, the outer sheet is bent against the inner side of the inner sheet, wherein in the second region of the outer sheet, the outermost rim of the outer sheet is welded to the inner side of the inner sheet along the connection section, and
wherein the radius of the bend (R) of the outer sheet against the inner sheet is at least four times the thickness of each of the outer and inner sheets.

* * * * *